Figure 1:
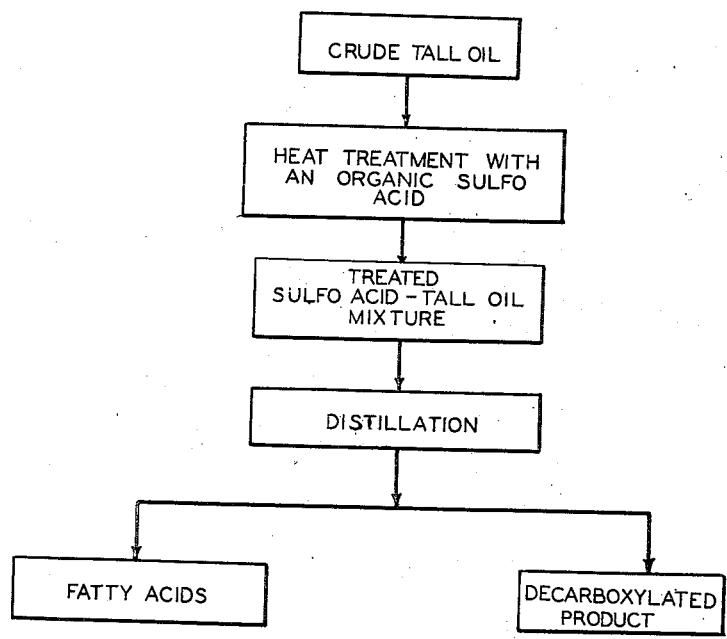

March 12, 1946.

A. L. OSTERHOF 2,396,471

TALL OIL TREATMENT

Filed May 1, 1942

2 Sheets-Sheet 1

INVENTOR.
ARTHUR L. OSTERHOF
BY
ATTORNEY

Patented Mar. 12, 1946

2,396,471

UNITED STATES PATENT OFFICE 2,396,471

TALL OIL TREATMENT

Arthur L. Osterhof, Newark, Del., assignor to Hercules Powder Company, Wilmington, Del., a corporation of Delaware Application May 1, 1942, Serial No. 441,392

11 Claims. (Cl. 260—97.5)

This invention relates to a method of separating the fatty and resin acid components of tall oil by means of heat treatment in the presence of an organic sulfo acid.

In the manufacture of paper pulp, the wood chips which form the basis of the pulp are acted on by an alkaline liquor which attacks the non-cellulose constituents as, for example, fatty and resin acids and leaches them from the cellulose. The fresh alkaline liquor which is used in this so-called cooking operation is known as the white liquor and the spent liquor of digestion which is drained from the pulp and includes the fatty and resin acids in the form of alkaline soap is known as the black liquor. Upon cooling of the black liquor, the soap separates and floats to the top of the liquor due to the salting out action of the strong alkali. This floating matter is known in the trade as crude tall oil soap. Crude tall oil soap is characterized as being dark brown, impure, and highly ill-smelling. Upon treatment with an acid, this soap yields a less dark brown, viscous, oily product known in the trade as tall oil.

Within limits reported in the literature, tall oil contains 25 to 60% fatty acids, mainly of the oleic series, 25 to 60% resin acids, which may include 50 to 90% abietic acid, and 7 to 20% unsaponifiable material, which may contain phytosterols, lignins, mercaptans, and higher alcohols.

Heretofore separation of the fatty and resin acids of the tall oil was made by means of distillation, however, this method is not satisfactory because of the relative closeness in the boiling points of the components. Further disadvantages of this distillation method includes equipment corrosion which occurs during the distillation process, and partial destruction of the relatively commercially valuable fatty and resin acid components.

In accordance with this invention, the fatty and resin acid components of tall oil may be separated by subjecting the tall oil to a decomposition treatment with heat in the presence of a sulfo acid, whereby the resin acid constituents are converted to the decarboxylated product as for example abietenes, abietines and/or abietanes and the fatty acids remain unaffected. Organic sulfo acids operable in accordance with this invention may be selected from that group of sulfo acids having the type formula, $RSO_3H$ and $ROSO_3H$ where R is an organic radical. Para-toluene sulfonic acid is a typical sulfo acid of the $RSO_3H$ type and ethyl sulfuric acid is a typical sulfo acid of the $ROSO_3H$ type. Separation of the decarboxylated product from the unaffected fatty acids may be carried out in one of two ways, either by means of distillation wherein the decarboxylated product is recovered as a distillate and the fatty acids remain behind as a residue, or by means of treatment with an alkali followed by solvent extraction wherein the decarboxylated product is removed by the solvent and the fatty acids which are now in the form of soap remain in the residue.

The method in accordance with this invention is illustrated by the following specific examples.

EXAMPLE 1

*Para-toluene sulfonic acid—distillation treatment*

Five hundred grams of tall oil and 0.5 g. of para-toluene sulfonic acid were heated at 300° C. for one hour under atmospheric pressure. The mixture was cooled and water-washed to remove unreacted catalyst and other water-soluble constituents. The water-washed mixture was dried by heating to 110° C. for 10 minutes. One-half of the mixture was fractionated and the decarboxylated product recovered in the distillate. Analysis of the residue indicated 80% fatty acids, and 5% resin acids.

EXAMPLE 2

*Para-toluene sulfonic acid—neutralization treatment*

The other half of the water-washed mixture of Example 1 was neutralized with a 2% solution of sodium hydroxide in aqueous alcoholic solution, and the alkaline treated mixture extracted with 5 litres of gasoline solvent at 25° C. The gasoline phase of decarboxylated product was separated from the fatty acid soaps, and the gasoline solvent distilled off to recover the decarboxylated product.

In accordance with the procedures set forth in

Examples 1 and 2, the sulfo acids listed below were tested and gave results as indicated:

| Example | Sulfo acid used | Method of separation | Separation residue | |
|---|---|---|---|---|
| | | | Resin acid | Fatty acid |
| | | | Per cent | Per cent |
| 3 | 15.0 g. naphthalene sulfonic acid. | Distillation | 10 | 80 |
| 4 | ----do---- | Neutralization | 15 | 85 |
| 5 | 5.0 g. Ethyl Sulfonic acid. | Distillation | 8 | 85 |
| 6 | ----do---- | Neutralization | 12 | 88 |
| 7 | 2.0 g. benzene sulfonic acid. | Distillation | 8 | 82 |
| 8 | ----do---- | Neutralization | 11 | 88 |
| 9 | 5.0 g. cymene sulfonic acid. | Distillation | 5 | 85 |
| 10 | ----do---- | Neutralization | 8 | 90 |
| 11 | 25.0 g. anthracene bisulfonic acid. | Distillation | 8 | 80 |
| 12 | ----do---- | Neutralization | 10 | 90 |
| 13 | 2.0 g. monochloro benzene sulfonic acid. | Distillation | 5 | 85 |
| 14 | ----do---- | Neutralization | 7 | 92 |
| 15 | 1.0 g. sulfo acetic acid | Distillation | 11 | 80 |
| 16 | ----do---- | Neutralization | 15 | 85 |
| 17 | 5.0 g. ethyl sulfuric acid. | Distillation | 10 | 75 |
| 18 | ----do---- | Neutralization | 15 | 82 |

In accordance with the processes of this invention, it will be desirable to first remove any solid matter from the tall oil. The tall oil is then treated with a suitable organic sulfo acid catalyst as, for example, a sulfo acid selected from that group of sulfo acids having a general type formula, RSO₃H or ROSO₃H where R may be any organic radical. Numerous sulfo acids may be employed as catalyst for the treatment of the tall oil. Sulfo acids of the type formula RSO₃H are commonly referred to as sulfonic acids and suitable sulfonic acids are the carbocyclic sulfonic acids, and more particularly, the aromatic sulfonic acids as, for example, benzene sulfonic acid, naphthalene sulfonic acid, anthracene sulfonic acid, phenanthrene sulfonic acid, the benzene disulfonic acids, benzene trisulfonic acid, and the polysulfonic acids of naphthalene, anthracene, and phenanthrene; the alkylated derivatives of benzene sulfonic acid as, for example, para-toluene sulfonic acid and the alkylated derivatives of naphthalene sulfonic acid, anthracene sulfonic acid and phenanthrene sulfonic acid; the methyl isopropyl derivatives of phenanthrene sulfonic acid, sulfonic acids of the phenols, as, for example, phenol sulfonic acid, hydroquinone sulfonic acid, naphthol sulfonic acid, etc., alkylated derivatives of the phenol sulfonic acids as, for example, cresol sulfonic acid, ethyl phenol sulfonic acid, xylenol sulfonic acid, etc., the halogenated derivatives of phenol sulfonic acid as, for example, chlor-phenol sulfonic acid, brom-naphthol sulfonic acid, etc., diphenyl sulfonic acid, alkylated derivatives of diphenyl sulfonic acid as, for example, phenyl toluene sulfonic acid, ethyl phenyl benzene sulfonic acid, etc., the halogenated derivatives of diphenyl sulfonic acid as, for example, chlor-diphenyl sulfonic acid, brom-diphenyl sulfonic acid, etc., alkoxyl derivatives of benzene sulfonic acid as, for example, anisol sulfonic acid, phenetole sulfonic acid, etc., alkoxyl derivatives of naphthalene sulfonic acid as, for example, methoxy naphthalene sulfonic acid, isopropoxy naphthalene sulfonic acid, etc., alkoxyl derivatives of anthracene sulfonic acid as, for example, methoxy anthracene sulfonic acid, butoxy anthracene sulfonic acid, etc., alkoxy derivatives of phenanthrene sulfonic acid, as, for example, ethoxy phenanthrene sulfonic acid, butoxy phenanthrene sulfonic acid, etc., halogenated derivatives of benzene sulfonic acid as, for example, dichlor-benzene sulfonic acid, brombenzene sulfonic acid, etc., halogenated derivatives of naphthalene sulfonic acid as, for example, chlor-naphthalene sulfonic acid, brom-naphthalene sulfonic acid, etc., halogenated derivatives of anthracene sulfonic acid as, for example, trichlor-anthracene sulfonic acid, chlor-iodoanthracene sulfonic acid, etc., halogenated derivatives of phenanthrene sulfonic acid as, for example, dichlor-dibrom-phenanthrene sulfonic acid, dibrom-phenanthrene sulfonic acid, etc., sulfonic acids of diphenyl ether as, for example, diphenyl ether sulfonic acid, diphenyl ether disulfonic acid, etc., alicyclic sulfonic acids as, for example, pinene sulfonic acid, camphor sulfonic acid, etc., cymene sulfonic acid, halogenated derivatives of cymene sulfonic acid, alkylated derivatives of camphor sulfonic acid, halogenated derivatives of camphor sulfonic acid, aliphatic sulfonic acids particularly the paraffin sulfonic acids, the sulfonic acids of succinic acids or its esters formed by the addition of sulfurous acid to the ethylenic linkage of maleic anhydride or maleic acid esters.

Sulfo acids of the type formula ROSO₃H are known as organic sulfuric acids and may also be employed as catalysts. Suitable organic sulfuric acids are, carbocyclic sulfuric acids and, more particularly, the aromatic sulfuric acids as, for example, phenyl sulfuric acid, naphthyl sulfuric acid, anthranyl sulfuric acid, phenanthryl sulfuric acid and the polysulfuric acids of these aromatic compounds, alkyl derivatives of phenyl sulfuric acid as, for example, cresyl sulfuric acid, xylenyl sulfuric acid, etc., alkyl derivatives of phenanthryl sulfuric acid as, for example, methyl isopropyl phenanthrene sulfuric acid, etc., aliphatic sulfuric acid as, for example, acetyl sulfuric acid, ethyl sulfuric acid, etc.

It is found that the simple aromatic sulfonic acids are particularly desirable as a treating agent for the tall oil.

Treatment of the tall oil, Fig. 1, is made in the presence of about 0.01% to 5% by weight of a suitable sulfo acid as, for example, para-toluene sulfonic acid which treatment decomposes the resin acid present in the tall oil to decarboxylated products which may include abietenes, abietines and/or abietanes, while the fatty acids present remain substantially unaffected. Tall oil treatment may be made with a suitable sulfo acid at a reaction temperature which may vary from about 150° C. to about 325° C. and is preferably about 250° C. to about 300° C. The reaction time may vary from about 0.25 hour to about 12 hours and is preferably about 0.5 to about 3 hours, depending upon the reaction conditions as, for example, the temperature and the type of sulfo acid catalyst used.

After the sulfo acid-tall oil treatment has been completed, it will be found desirable to remove any unreacted and excess sulfo acids by means of water-washing. The washing step may be carried out at elevated temperatures as, for example, from about 50° C. to about 100° C.

After the sulfo acid treated tall oil has been water-washed, the washed mixture is subjected to distillation which may be at a reduced pressure whereby the more volatile decarboxylated product is separated from the higher boiling fatty acids.

Figure 2:
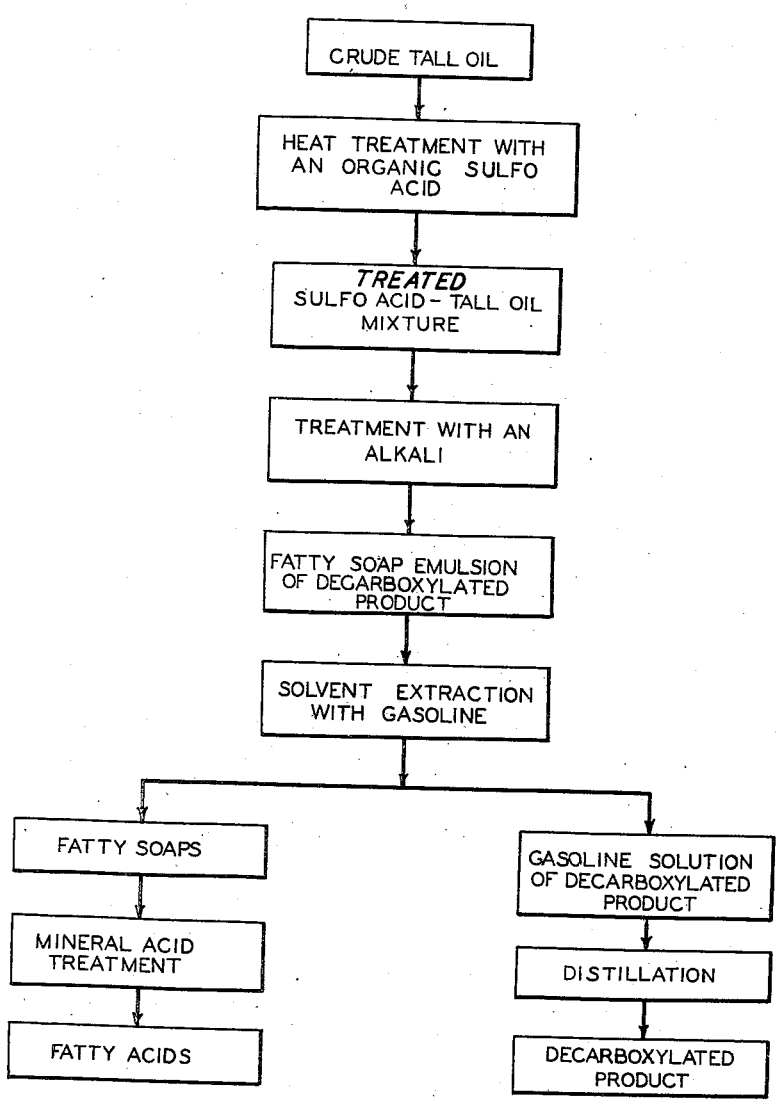

Fig. 2 shows an alternative method of separating the decarboxylated product and fatty acids formed which includes the neutralization of the sulfo acid treated tall oil as by saponification with a suitable alkali such as, for example, aqueous or aqueous alcoholic sodium hydroxide, sodium carbonate, potassium hydroxide, etc., which treatment causes the formation of fatty acid soap which soap may then be separated from the neutral decarboxylated product by means of solvent extraction. Suitable solvents for the neutral product are the aromatic hydrocarbon solvents, such as, for example, benzene, toluene, xylene, etc.; saturated petroleum hydrocarbon solvents as, for example, gasoline, kerosene, petroleum ether, etc.; saturated acyclic hydrocarbons as, for example, cyclohexane, paramenthane, decahydronaphthalene, etc. Treatment of the fatty acid soaps-decarboxylated product admixture with a suitable solvent as, for example, gasoline, frees the decarboxylated product which is then extracted by means of the gasoline solvent. This solvent extraction may be carried out at a temperature of about 20° C. to about 120° C. Where temperatures are sufficient to cause volatilization as, for example, temperatures near or above 100° C. pressure vessels may be used. After extraction of the decarboxylated product with the gasoline solvent, the residue of fatty acid soaps may be decomposed with any suitable aqueous inorganic or organic acid to form the free fatty acids, which are then washed or otherwise purified for further use in the fatty acid art. The decarboxylated product may be recovered from the gasoline solution by removing the gasoline by means of distillation. The neutralization and solvent extraction process of treating the sulfo acid-tall oil mixture permits a sharper separation of the acid and non-acid components present than is permitted by means of the distillation method alone.

This invention provides finer grades of fatty acids from tall oil than has heretofore resulted according to prior art processes. The recovered decarboxylated product may be used in the preparation of various resins and in the manufacture of greases.

In accordance with this invention, it has been shown that the resin acid constituents of tall oil may be successfully separated from the fatty acid constituents thereof in an effective, efficient and novel manner which comprises the decomposition of the tall oil with heat and a suitable sulfo acid as, for example, paratoluene sulfonic acid to form a decarboxylated product from the resin acid constituents of the tall oil, whereupon the lower boiling product is then readily separated from the fatty acids by means of distillation, or by means of neutralization and solvent extraction.

What I claim and desire to protect by Letters Patent is:

1. In the process of separating the resin and fatty acid components of tall oil, the step which includes heating the tall oil in the presence of a catalyst selected from the group consisting of catalysts having the type formula $RSO_3H$ and $ROSO_3H$, where R is an organic radical at a temperature between about 150° and about 325° C. for a time from about 0.25 hour to about 12 hours to decarboxylate the resin acid component.

2. In the process of separating the resin and fatty acid components of tall oil, the step which includes heating the tall oil in the presence of an organic sulfonic acid at a temperature between about 150° C. and about 325° C., for a time from about 0.25 hour to about 12 hours to decarboxylate the resin acid component.

3. In the process of separating the resin and fatty acid components of tall oil, the step which includes heating the tall oil in the presence of an organic sulfuric acid at a temperature between about 150° C. and about 325° C., for a time from about 0.25 hour to about 12 hours to decarboxylate the resin acid component.

4. In the process of separating the resin and fatty acid components of tall oil, the step which includes heating the tall oil in the presence of a carbocyclic sulfonic acid at a temperature between about 150° C. and about 325° C., for a time from about 0.25 hour to about 12 hours to decarboxylate the resin acid component.

5. In the process of separating the resin and fatty acid components of tall oil, the step which includes heating the tall oil in the presence of an aromatic sulfonic acid at a temperature between about 150° C. and about 325° C., for a time from about 0.25 hour to about 12 hours to decarboxylate the resin acid component.

6. In the process of separating the resin and fatty acid components of tall oil, the step which includes heating the tall oil in the presence of an aliphatic sulfuric acid at a temperature between about 150° C. and about 325° C., for a time from about 0.25 hour to about 12 hours to decarboxylate the resin acid component.

7. In the process of separating the resin and fatty acid components of tall oil, the step which includes heating the tall oil in the presence of para-toluene sulfonic acid at a temperature between about 150° C. and about 325° C., for a time from about 0.25 hour to about 12 hours to decarboxylate the resin acid component.

8. In the process of separating the resin and fatty acid components of tall oil, the step which includes heating the tall oil in the presence of benzene sulfonic acid at a temperature between about 150° C. and about 325° C., for a time from about 0.25 hour to about 12 hours to decarboxylate the resin acid component.

9. In the process of separating the resin and fatty acid components of tall oil, the step which includes heating the tall oil in the presence of ethyl sulfuric acid at a temperature between about 150° C. and about 325° C., for a time from about 0.25 hour to about 12 hours to decarboxylate the resin acid component.

10. In the process of separating the resin and fatty acid components of tall oil, the steps which include heating the tall oil in the presence of a catalyst selected from the group consisting of catalysts having the type formula $RSO_3H$ and $ROSO_3H$, where R is an organic radical, at a temperature between about 150° C. and about 325° C., for a time from about 0.25 hour to about 12 hours to decarboxylate the resin acid component, neutralizing the treated tall oil, treating the neutralized mixture with a selective solvent for the decarboxylated resin and separating the solution of decarboxylated resin from the neutralized fatty acids.

11. In the process of separating the resin and fatty acid components of tall oil, the steps which include heating the tall oil in the presence of para-toluene sulfonic acid at a temperature between about 150° C. and about 325° C., for a time from about 0.25 hour to about 12 hours to carboxylate the resin acid component, neutralizing the fatty acids and treating the resulting mixture with a selective solvent for the decarboxylated resin to recover the decarboxylated product.

ARTHUR L. OSTERHOF.

Certificate of Correction

Patent No. 2,396,471.　　　　　　　　　　　　　　　　　　　　　　　　March 12, 1946.

ARTHUR L. OSTERHOF

It is hereby certified that error appears in the printed specification of the above numbered patent requiring correction as follows: Page 3, second column, lines 69–70, claim 11, for "carboxylate" read *decarboxylate*; and that the said Letters Patent should be read with this correction therein that the same may conform to the record of the case in the Patent Office.

Signed and sealed this 4th day of June, A. D. 1946.

[SEAL]

LESLIE FRAZER,
*First Assistant Commissioner of Patents.*